A. M. GOW.
DUMP CAR.
APPLICATION FILED JUNE 15, 1918.

1,290,735.

Patented Jan. 7, 1919.
5 SHEETS—SHEET 1.

WITNESSES:

INVENTOR.
Alexander M. Gow
BY
ATTORNEY.

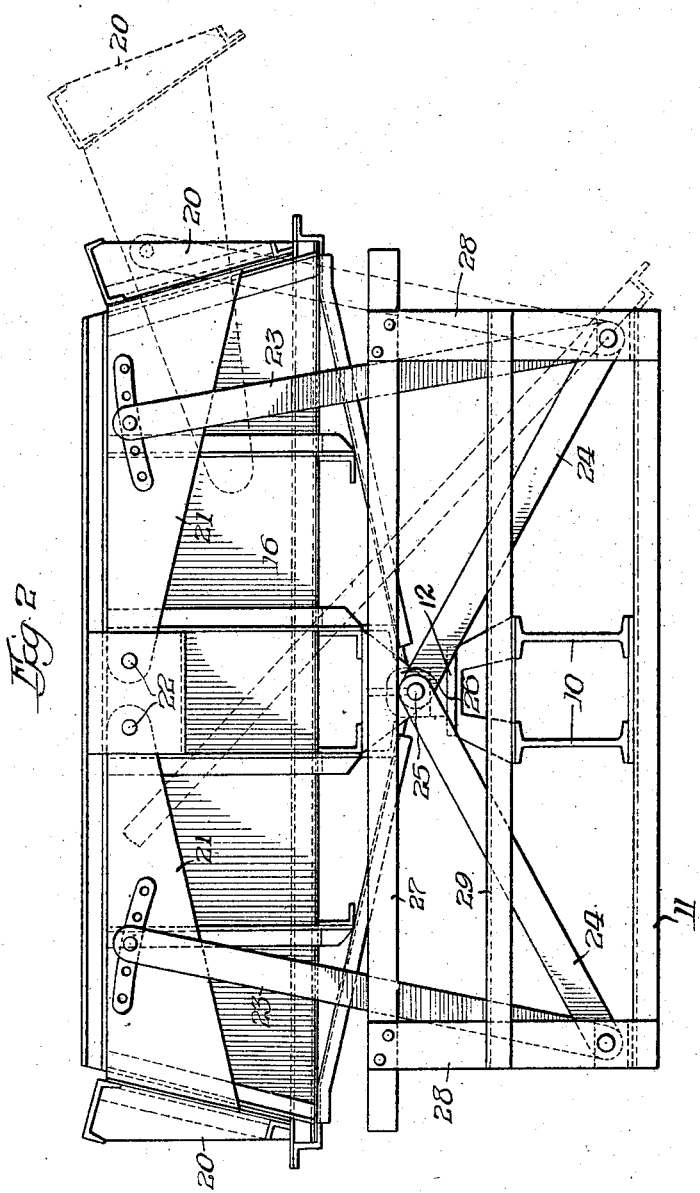

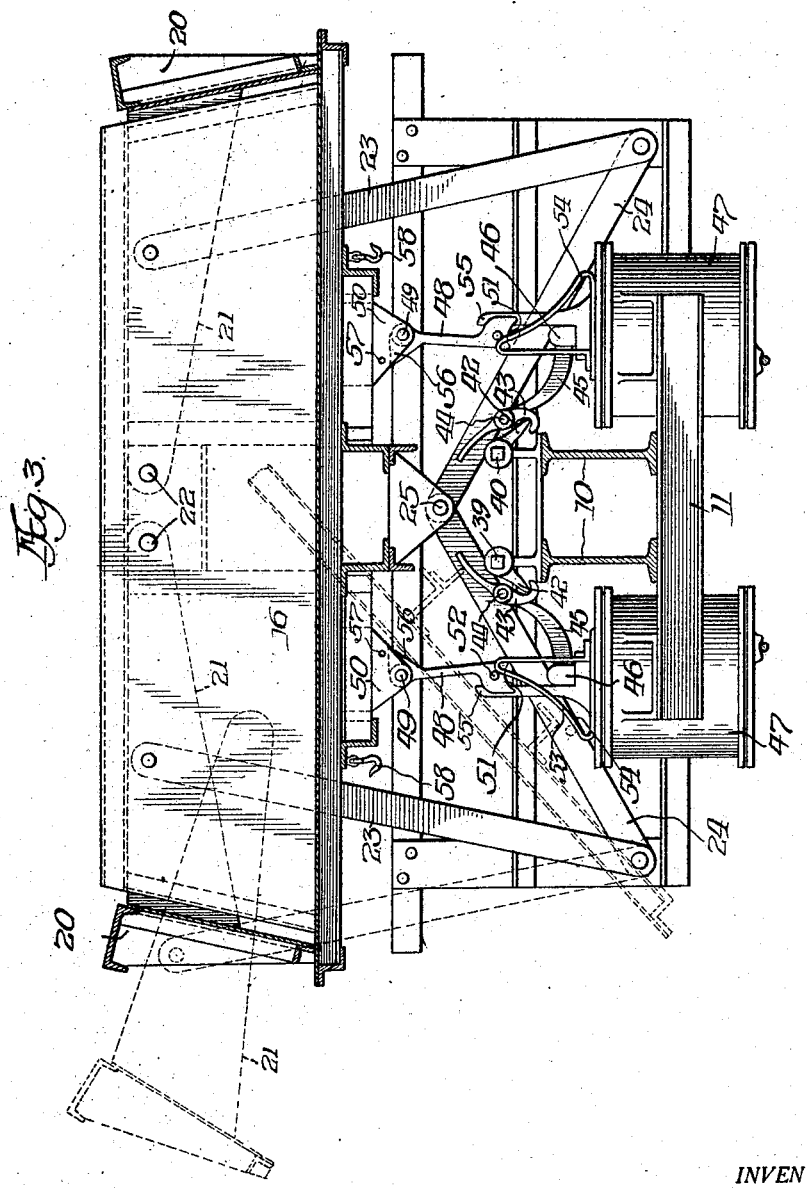

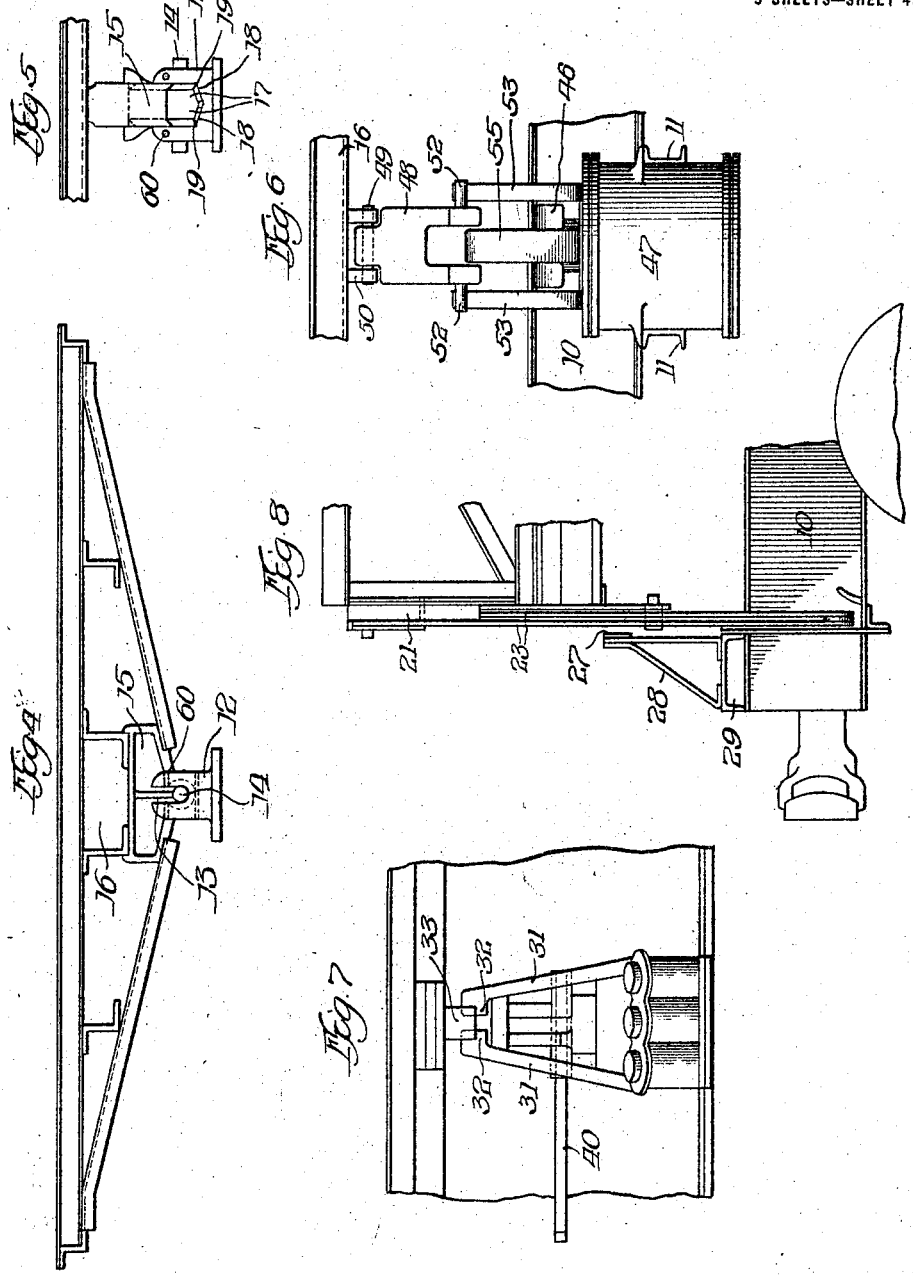

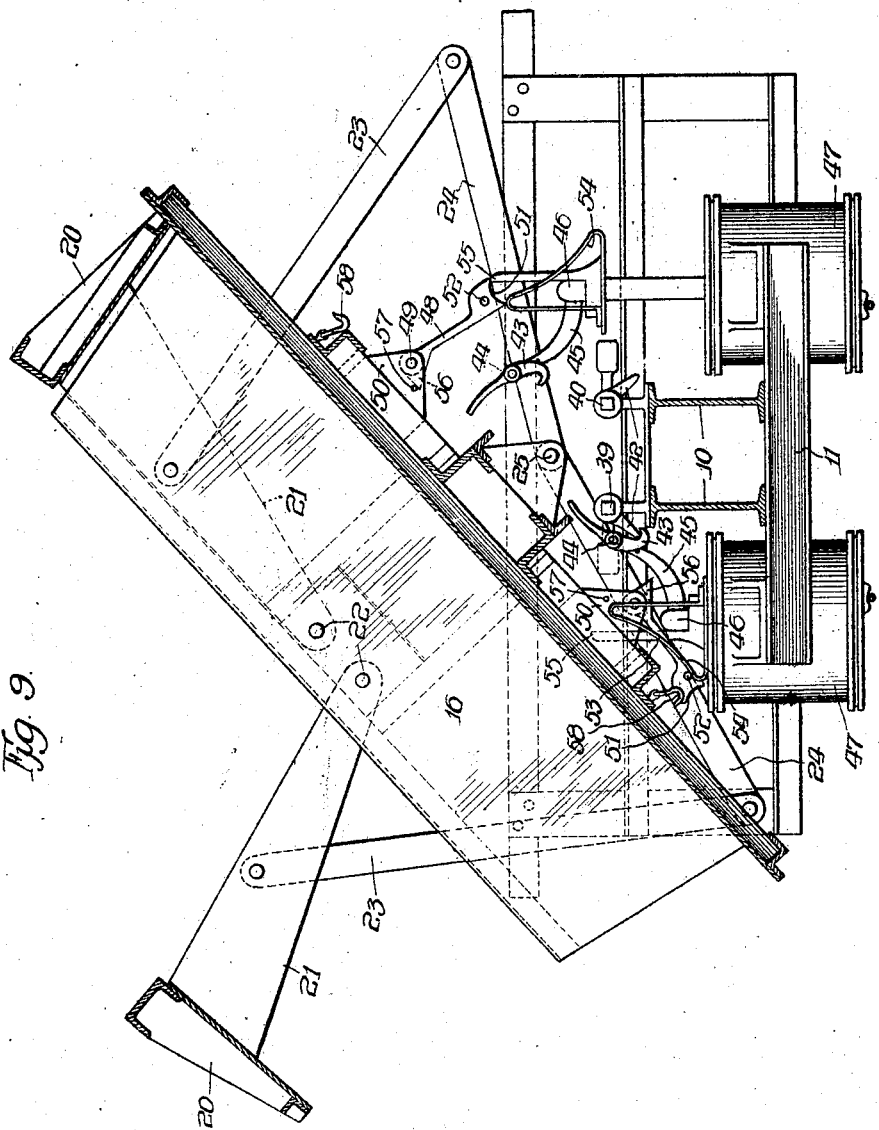

UNITED STATES PATENT OFFICE.

ALEXANDER M. GOW, OF DULUTH, MINNESOTA.

DUMP-CAR.

1,290,735.  Specification of Letters Patent.  Patented Jan. 7, 1919.

Application filed June 15, 1918. Serial No. 240,116.

*To all whom it may concern:*

Be it known that I, ALEXANDER M. GOW, a citizen of the United States, and resident of Duluth, in the county of St. Louis and State of Minnesota, have invented certain new and useful Improvements in Dump-Cars, of which the following is a specification.

This invention relates to that class of cars known as air dump cars, in which a car body is mounted on a car frame by hinges and is caused to dump to either side and returned to horizontal position by means of oppositely disposed air cylinders.

One of the objects of my present invention is to simplify and improve the dumping, locking and unlocking mechanism whereby the car may be dumped and righted in an improved manner.

Another object of my invention is to make it possible for the body of the car to be entirely disconnected from the frame thereof without changing connections of operating members and other parts.

Another object is to equalize the load on all of the pivotal connections between the car body and frame to prevent breakage of one or more of the pivotal connections.

Another object is to provide a dump door arrangement whereby strains incident to movement of the car while in a dumping position may be overcome without breakage.

These and other objects are accomplished by means of the arrangement shown in the accompanying drawings, in which—

Fig. 2 is an end elevation of the dump car, showing the frame parts thereof and the door operating mechanism;

Fig. 3 is a transverse sectional view of the dump car, parts being in elevation, showing the means for unlocking and dumping the car;

Fig. 4 is an end elevation, showing the pivotal connection between the car frame and car body;

Fig. 5 is a fragmentary detail side elevation of the connection between the car frame and car body;

Fig. 6 is a detail side elevation of the dumping mechanism of the car;

Fig. 7 is a detail side elevation of the locking arrangement;

Fig. 8 is a fragmentary side elevation of the car at one end; and

Fig. 9 is a transverse sectional view of a dump car, shown in a dumped position.

Figure 1:
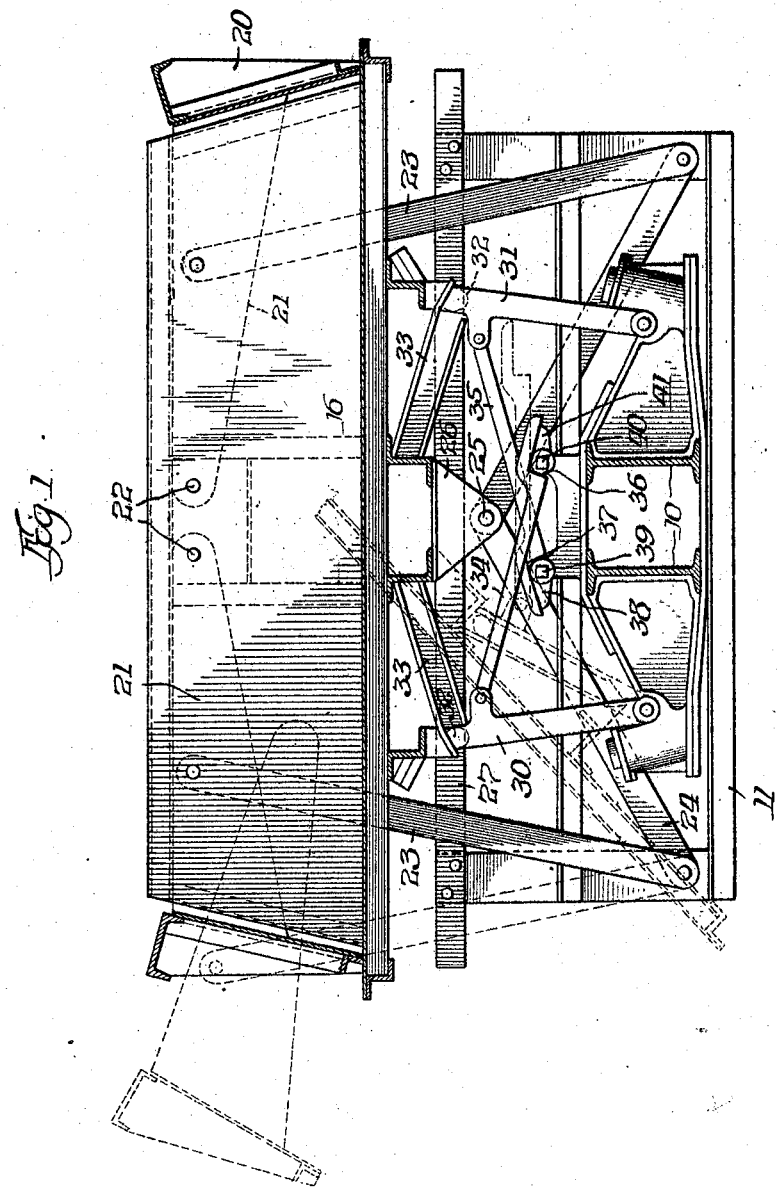
Figure 1 is a transverse sectional view of the car, parts being shown in elevation, showing, among other things, the locking and unlocking mechanism and the dump door operating mechanism.

The various novel features of my invention will be apparent from the following description and drawings and will be particularly pointed out in the appended claims.

Referring now to the figures of the drawings, it will be noted that I have provided a dump car having a suitable center sill 10 mounted over transverse beams 11. Mounted over the center sill of the frame construction are a plurality of longitudinally alined bearing members 12 (Figs. 4 and 5) having longitudinally alined open slots 13 for the reception of pivot pins 14 carried by castings 15 secured to the body portion 16 of the dump car, said body being oscillated or tilted to one side or the other by mechanism to be referred to hereinafter. The pins 14, however, do not engage the bottom of the slots. In this connection it will be noted, reference being had to Fig. 5, that the lower end of the casting 15 is beveled at 17 in two directions and the bottom portion of the bearing 12 is correspondingly beveled at 18, whereby the casting 15 will tend to remain transversely central with respect to its coöperating bearing member 12. Interposed between the beveled faces 17 and 18 are liners 19, the liners at the ends of the car being thinner than those at the middle portion of the car, the object being to maintain the axes of the pivotal connections between the car body and frame in longitudinal alinement when the body is loaded. By so doing the load is evenly distributed upon all of the pivotal connections thereby preventing breakage of any one of them. As mentioned hereinabove, the load is taken by the beveled portions of the bearing members and not by the pins 14. The pins merely serve to prevent relative lateral movement of the upper and lower coöperating beveled bearing members.

The car body 16 is provided with side dump doors 20 having laterally extending plates 21, the inner ends of which are pivotally connected at 22 to a suitable central support. Pivotally connected to each of the plates 21 near the sides of the car are links 23, the lower ends of which are pivoted to other links 24 having their inner ends pivotally connected at 25, which is the center of oscillation of the car body, to a casting 26 carried by the car body frame structure. Normally the bottom ends of the links 23 do not engage the transverse frame member 11. However, when the car is dumped to one side or the other, the links on one side of the car pass into engagement with the frame member 11 in a manner to raise the dump doors on the side of the car being dumped, the link members 24 serving merely to hold the lower ends of the links 23 in position.

If the car is moved forwardly or rearwardly when the side dump doors 20 are in open position, especially during the dumping of a load, a tremendous strain is placed upon said doors and their plates 21, which, if not compensated for, will cause breakage of the parts in question. To meet this strain, the links 23 preferably are in two duplicate parts, which are pivoted on opposite sides of the plate 21. In juxtaposition to the links 23 is a transversely extending frame member 27 at each end of the car, against which the links 23 may move and be supported against excessive longitudinal movement, the transversely extending members 27 being reinforced by bracket members 28 (Fig. 8) connected to the end sills 29 of the car. In this manner the strain on the side dump doors and their plates 21, caused by movement of the car when the doors are opened, is transmitted through the links 23, transversely extending frame member 27 and brackets 28 to the end sills of the car.

Normally the body of the car is supported in its righted position by means of members 30 and 31 (Fig. 1), the lower ends of which are pivotally connected to the frame structure and the upper ends of which are provided with rollers or projections 32 which are adapted to move in guideways 33 when the car body is dumped to one side or the other. Not only is the car body normally held in righted position by the members 30 and 31, but the car body is locked in this position by oppositely arranged and transversely extending members 34 and 35, which are respectively pivotally connected to the members 30 and 31 and have locking shoulders 36 and 37 respectively, which engage portions of the frame. A cam 38 mounted upon a shaft 39, and which underlies the locking member 35, may be rotated in a manner to lift the locking shoulder 37 out of engagement with its coöperating locking frame member, whereby the car body may be dumped to the right. Likewise, the car body may be unlocked for dumping action to the left by rotating shaft 40, which carries cam 41 for lifting the locking member 34.

By referring to Fig. 3 of the drawings, it will be noted that shaft 39 is provided with an arm 42, which when the car body is in its righted position, is engaged by an operating dog 43 pivotally mounted at 44 upon one end of an arm 45 rigidly secured to the upper end of a vertically movable piston rod 46, to the lower end of which is connected a piston operable in the cylinder 47. This arrangement is duplicated on the other side of the car. From this arrangement it is apparent, therefore, that during the first part of the upward movement of the piston rod 46 on either side of the car, the car body will be unlocked preparatory to a dumping action to either side.

In connection with the dumping of the car, it is to be noted that I have provided on each side of the car a push member 48, which is pivotally connected at 49 to a bracket 50 carried by the car body. The lower end of each of the push members 48 is enlarged and recessed, as shown at 51, for the reception of the upper end of the piston rod 46. It will be noted also that the lower end of the push rod is in vertical alinement with the piston rod so that when the latter is elevated it comes into contact with the recessed portion 51 of the push member 48 for dumping the car to the other side.

Let it be assumed that it is desired to dump the car to the left, as shown in Fig. 3. The right-hand piston rod 46 will be raised by fluid pressure, it being understood that suitable valves have been operated to permit the admission of fluid under pressure, the first part of its movement causing the locking member 34 to be raised out of locking position by cam 41. A continued upward movement of the piston rod 46 will cause the latter to engage the right-hand push rod 48 to dump the car toward the left, during which movement the left-hand side doors 20 will be moved into an open position. During this dumping operation the left-hand push rod 48 will swing about its pivot 49 in a transverse lateral direction with respect to the car body, the lower end of the push rod 48 moving outwardly and being guided in said outward movement by its laterally projecting pins 52 sliding over the cam surfaces 53 of the guide brackets 54 secured to the top of the cylinder. When the car is completely moved into its left-hand dumping position, the push rod 48 will be substantially parallel with the bottom of the car body. It will be noted that as the right-hand piston rod 46 is raised it is held in a vertical position by the guide member 55 secured to the top of the cylinder, the push rod 48 being retained substantially at right angles to the car body and having its projection 56 at the upper end thereof out of engagement with a limiting stop member 57. The sole function of the coöperating members 56 and 57 is to prevent the push member 48 from swinging inwardly during the descent of the car body at that side, thereby preventing breakage of the push member or any parts with which it may come in contact. It will be understood that when the car body has been dumped to the left-hand side, for example, the right-hand dog 43, after it has performed its unlocking function, will move or slip out of engagement with its corresponding member 42 on the unlocking shaft 40, and during the righting of the car the control dog 43 will slide over its coöperating member 42 until it passes into coöperative association therewith, as shown in Fig. 3 of the drawing, when the car body has reached its righted position. After the car body has been dumped to the left, as shown in dotted lines in Fig. 3, it will be righted by first exhausting the air in the right-hand cylinder 47 and causing the piston rod 46 on the left-hand side to be elevated. During this movement the left-hand piston rod 46 engages the inner edge of the push member 48 until the car body assumes its central righted position, whereupon the car body automatically becomes locked by the locking mechanism hereinabove referred to. The dumping operation of the right-hand side of the car is the same as that described in connection with the dumping on the left-hand side of the car.

If it is desired to test the cylinders without dumping the car body, the same may be accomplished by swinging the push members outwardly and securing the same in inoperative position by hooks 58, which may engage the push members and hold them in raised position. The unlocking dogs 43 also may be swung out of engagement with their coöperating member 42 and locked in such an inoperative position in any suitable manner to prevent the car body from being unlocked, for example by inserting holding pins into the holes provided in the arm 45 after the members 43 have been swung into an inoperative position. By so doing, the cylinders may be tested with complete safety whether or not the man testing the car is under the car or at one side thereof.

It will be noted that the dumping, locking, unlocking and door operating mechanisms in each case are secured to either the car frame or car body, but not to both. Accordingly, if the car is tipped over for any reason, the car body may fall away from the car frame without affecting the mechanisms hereinabove mentioned. If desired, the open end of each of the bearing slots 13 may be closed by transverse pins which may pass through alined openings 60 for locking the car frame and body together.

It is evident that there may be modifications of my invention herein particularly shown and described and it is my intention to cover all such modifications which do not involve a departure from the spirit and scope of the invention as set forth in the following claims.

I claim:

1. In a dump car, a body tiltable to opposite sides for dumping, said body normally being locked in its righted position, a fluid operated piston rod having a rigid laterally extending arm, and a member mounted on said arm for unlocking the car body prior to a dumping action being transmitted thereto.

2. In a dump car, a car body tiltable to opposite sides for dumping, said car body normally being locked in righted position, a push member connected to said car body, a fluid operated piston rod having a rigid laterally extending arm connected thereto, and a member mounted on said arm for unlocking the car body during one part of the movement of said piston rod, the push member lying within the path of movement of said piston rod whereby the car body is tilted in one direction upon a continued movement of the piston rod.

3. In a dump car, a car body tiltable to opposite sides for dumping, said car body normally being locked in righted position, a push member pivotally connected to said car body, a fluid operated piston rod having an arm connected thereto, and a pivotally mounted member on said arm for unlocking the car body during one part of the movement of said piston rod, the push member lying within the path of movement of said piston rod whereby the car body is tilted upon further movement of the piston rod.

4. In a dump car, a body tiltable in different directions for dumping purposes, said car body normally being locked in righted position, an operating shaft having lock control mechanism associated therewith, a fluid actuated piston rod having a rigid laterally extending arm thereon unattached to the car body, and a member mounted on said arm for actuating said operating shaft to unlock the car body.

5. In a dump car, a body tiltable in different directions for dumping purposes, said car body normally being locked in righted position, an operating shaft having lock control mechanism associated therewith, a fluid actuated piston rod having a rigid laterally extending arm thereon, a member mounted on said arm for actuating said operating shaft to unlock the car body, a push member connected with said car body and lying within the path of movement of said piston rod whereby the car body may be tilted after it is unlocked.

6. In a dump car, a car body tiltable in different directions, a push member connected to said car body, a fluid actuated piston rod normally out of engagement and movable into engagement with said push member for tilting the car body, and means for guiding said piston rod in a vertical right line movement.

7. In a dump car, a car body tiltable in different directions, a push member connected to said car body, a fluid actuated piston rod normally out of engagement and movable into engagement with said push member for tilting the car body, means for guiding said piston rod in a vertical right line movement, and means whereby said push member may move into a position parallel with the bottom of the car body when the latter is tilted in one direction.

8. In a dump car, a car frame, a car body pivotally mounted on a fixed center thereon for tilting movement in opposite directions and having dump doors, means for operating said dump doors, lock means for normally holding the car body in righted position, and power operated dumping means for said car body, all of said means being arranged in a manner whereby the car body is free to become disconnected from the car frame without changing the connections of said means.

9. In a dump car, a car body mounted on a fixed center for oscillation, fluid operated dumping means therefor, locking means for the car body, and door operating means, all of said means coöperating between the body and frame but having no member secured to both body and frame, whereby the body may be removed without changing the connections of any of said means.

10. In a dump car, a frame having an open bearing, a car body pivotally mounted on a fixed center in said bearing, fluid operated means for tilting said car body in opposite directions about the pivotal connection, locking means, and door operating means, all of said means being connected to the body or frame but not to both, whereby the body may be removed from the frame without changing the connections of any of said means.

11. In a dump car, a car frame, and a car body mounted thereon for oscillation, there being a joint between said frame and body including a wedge-shaped member attached to the body, a compound wedge-shaped member attached to the frame, and liners inserted between said wedge-shaped surfaces for maintaining the pivotal connections between the car frame and body in alinement.

12. In a dump car, a car body tiltable in opposite directions, a door on said body adapted to be elevated with reference to the floor of the car when the car is tilted, a vertically disposed lifting member for said door, and a transversely arranged member secured to the end sill of the car and adapted to resist endwise motion of the door by engagement with an intermediate portion of said lifting member.

13. In a dump car, a car body tiltable in different directions for dumping purposes, a rigid push member pivotally connected thereto, and a fluid operated piston for engaging the end of said push member for dumping the car and for engaging an outside edge of said push member for righting the car.

14. In a dump car, a car body tiltable in different directions, locking and unlocking means therefor, dumping means therefor including fluid cylinders, and means whereby said unlocking and dumping means may be rendered inoperative for testing the cylinders.

Signed at Duluth, Minn., this 10th day of June, 1918.

ALEXANDER M. GOW.

Witnesses:
JOHN E. CARLSON,
O. L. MATTHEY.